United States Patent
Castelli

[11] Patent Number: 5,272,492
[45] Date of Patent: Dec. 21, 1993

[54] COMPENSATION OF MAGNIFICATION MISMATCH IN SINGLE PASS COLOR PRINTERS

[75] Inventor: Vittorio Castelli, Yorktown Heights, N.Y.

[73] Assignee: Xerox Corporation, Stamford, Conn.

[21] Appl. No.: 984,139

[22] Filed: Dec. 1, 1992

[51] Int. Cl.$^5$ .................................... G03G 15/01
[52] U.S. Cl. .......................... 346/157; 355/210; 355/326
[58] Field of Search .............. 355/210, 326, 327, 328, 355/200, 317; 346/157

[56] References Cited

U.S. PATENT DOCUMENTS

| | | | |
|---|---|---|---|
| 4,252,432 | 2/1981 | Ophey | 355/212 |
| 4,403,848 | 9/1983 | Snelling | 355/327 |
| 4,416,533 | 11/1983 | Tokunaga et al. | 346/160 |
| 4,578,331 | 3/1986 | Ikeda et al. | 355/235 |
| 4,697,920 | 10/1987 | Palm et al. | 355/212 |
| 4,791,452 | 12/1988 | Kasai et al. | 355/326 |
| 4,914,477 | 4/1990 | Young et al. | 355/212 X |
| 5,101,232 | 3/1992 | Evans et al. | 355/208 |
| 5,111,242 | 5/1992 | Tanimoto et al. | 355/211 |
| 5,113,202 | 5/1992 | Loce et al. | 346/157 X |
| 5,153,644 | 10/1992 | Yang et al. | 355/236 |

FOREIGN PATENT DOCUMENTS 69075 4/1986 Japan.

*Primary Examiner*—Benjamin R. Fuller
*Assistant Examiner*—J. E. Barlow, Jr.
*Attorney, Agent, or Firm*—Oliff & Berridge

[57] ABSTRACT

A single pass color printer provides registration by controlling the velocity of the photoreceptor as a plurality of color separation latent images are superimposed on an area of the photoreceptor. The velocity of the photoreceptor is controlled by averaged error values $v_{ij}$. The averaged error values $v_{ij}$ are determined periodically for the same photoreceptor or when an old photoreceptor is replaced with a new photoreceptor or when a user depresses a button in a display to recalibrate the averaged error values $v_{ij}$ after noticing degradation of point quality. The averaged error values are based upon at least one of time deviations, average transit times and average velocities of areas of the photoreceptor on which the latent images are formed. The calibration of the velocity variations is equivalent to a calibration of the belt thickness uniformity. Further, the method of determining or calibrating the averaged error values $v_{ij}$ can be used to verify that the method was properly done.

15 Claims, 3 Drawing Sheets

COMPENSATION OF MAGNIFICATION MISMATCH IN SINGLE PASS COLOR PRINTERS

BACKGROUND OF THE INVENTION

1. Field of the Invention

The present invention relates to image forming devices and, more particularly, to single pass color printers.

2. Description of the Related Art

In an electrophotographic process, such as xerography, an optical device scans a light pattern along a charged photosensitive surface to form a latent image corresponding to an electrical or optical input. The resulting pattern of charged and discharged areas on the surface forms an electrostatic latent image corresponding to the original image. Developing devices of the electrostatic copying machine develop the latent image using either yellow, magenta, cyan, and/or black developing toners for subtractive color systems or red, blue and green developing toners for additive color systems. The developing toners are composed of electrostatically attractable powder, which are attracted to the latent image areas formed on the charged photosensitive surface. The developed image is then transferred to a predetermined image medium, e.g., paper, to produce a reproduction and a permanent record of the original image.

In single-pass color printers, the red, green and blue color separation latent images are superimposed on an electroreceptor belt or drum prior to transfer to the recording medium. The color separation latent images are superimposed on the electroreceptor belt or drum by successive imaging stations located adjacent the electroreceptor belt or drum. Each imaging station records a color separation latent image corresponding to one of the colors. The single color separation latent image is developed with toner particles of a color complementary thereto prior to transfer to the recording medium. Various recording media can be used in conjunction with these color printers such as a sheet of paper, a transparency, etc. Various types of single-pass printers are known in xerographic art, as described below.

U.S. Pat. No. 5,113,202 to Loce et al. discloses a single pass highlight color printing system utilizing the disparity between the on-time of a printing system and the on-time of an optical image bar. The image bar output is adapted to be separated into two image outputs which expose two separate areas of a photoreceptor. Each exposed area is developed by a toner of a desired color and the developed image, having two colors thereon, is transferred to a copy sheet to form a two-color output copy.

U.S. Pat. No. 4,403,848 to Snelling et al. discloses a multi-color printer using an additive color process to provide either partial or full color copies. Multiple scanning beams, each modulated in accordance with distinct color image signals, are scanned across a photoreceptor at relatively widely separated points, and buffer means are provided to control the timing of the different color image signals to assure registration of the color images with one another. Each color image is developed prior to scanning of the photoreceptor by the next succeeding beam. Following the development of the last color image, the composite color image is transferred to a copy sheet. In an alternate embodiment, an input section for scanning color originals is provided. The input section outputs color image signals for use by the printing section to make full color copies of the original.

U.S. Pat. No. 4,791,452 to Kasai et al. discloses single-colored image printing and multi-colored image printing being carried out by an image forming apparatus in response to color signals. The image forming apparatus includes an image carrier, a first image forming unit having a first developer wherein a first color developing agent is stored, and a second image forming unit having a second developer wherein a second color developing agent is stored. A single color image is formed on the image carrier when only a first color signal is received by the apparatus in the single-colored image printing. When a single-colored image printing is carried out by the first developer, a prescribed bias voltage is applied to the second developer to protect the second color developing agent from the contamination by the first color developing agent of the single color image formed on the image carrier.

U.S. Pat. No. 4,416,533 to Tokunaga et al. discloses a nonimpact printer. Electric charges are distributed over the surface of an electrophotographic photosensitive drum of the printer by a corona charger, and the charged surface of the drum is exposed to a first information light. The induced latent image is developed by toner of a first color and the charged surface of the drum with the developed image of the first color, is again exposed to a second information light. The second induced latent image is developed by toner of a second color, so that a bicolor toner image is formed on the surface of the drum. The bicolor toner image is transferred onto a printing medium to obtain a print.

U.S. Pat. No. 4,578,331 to Ikeda et al. discloses an electrophotographic color image forming process wherein three light beams, each representing a color image information of a color document to be recorded obtained by color separation, are projected against an electrophotographic photosensitive member to form electrostatic latent images. The latent images are developed by toners of the three different colors and printed by transfer-printing to record a color image. The color image information is simultaneously written to a surface of the photosensitive member, either by successively writing a plurality of sets of three scanning lines, each representing image information of one color, or by writing image information of different colors of the same set separately in three different zones. The scanning lines represent image information of different colors for forming a repeating series of three strips of different colors. The electrostatic latent images formed on the scanning lines are excited in positions immediately before developing sections of respective colors and developed by the toners of respective colors to produce toner images of different colors, which are printed by transfer-printing on a transfer-printing sheet.

To achieve a quality image with the above-described single-pass printers, which image is not blurred in appearance and which does not contain unwanted artifacts, the registration of color separation latent images must be accurately provided in superimposed relationship while avoiding any motion induced image degradation. Accordingly, the motion of the electroreceptor belt or drum must be finely controlled, particularly in the span of the electroreceptor belt or drum which encompasses the imaging and developing stations forming the images. The following U.S. Pat. Nos. 5,101,232 and 5,153,644 describe two known methods to control the velocity of the photoreceptor and to correct image distribution due to vibrational and speed distortions.

U.S. Pat. No. 5,101,232 to Evans et al. discloses an apparatus and associated method for controlling the velocity of the photoreceptor within a reprographic machine having a seamed, web type photoreceptor. The images are separated by unexposed interdocument regions on the photoreceptor. The reprographic machine further includes a registration apparatus for registering copy substrates with developed latent images. The process of assuring that the seamed region of the photoreceptor lies within an interdocument region begins by first sensing an actual phase relationship between the photoreceptor seam and activity of the registration apparatus and then calculating a phase error value by comparing the actual phase relationship to a desired phase relationship. Next, the system determines an adjustment photoreceptor velocity as a function of the phase error. Subsequently, the photoreceptor is moved at a fixed velocity during exposure of the images. Changing the calculated reference and hence photoreceptor velocity is restricted to the interdocument zone, so that there are no velocity changes except when the interdocument zone is passing through the imaging station. This ensures that the registration requirements and image quality specifications are simultaneously accomplished.

U.S. Pat. No. 5,153,644 to Yang et al. discloses correction of image distortion in a reproduction machine due to vibrational or speed distortions in or between a moving photoreceptor and an imaging device projecting raster lines on the photoreceptor as it moves past the imaging device. An encoder senses the speed of the photoreceptor and also the relative vibrational motion between the photoreceptor and the imaging device and provides electrical signals to a signal separator for separating the electrical signals into lower and higher frequency signals. Further, a servo motor drives the photoreceptor and compensates for the lower frequency increases or decreases in the speed of the photoreceptor. The servo motor is driven by the separated lower frequency signals. An optical system pivots the projected raster lines to compensate for the image distortions which are of the higher frequencies. The optical system is driven by the higher frequency signals from the signal separator.

However, all of the above patents fail to disclose or teach accurate registration of superimposed color separation latent images by controlling the velocity of the span of the electroreceptor belt or drum which encompasses the imaging and developing stations forming the color separation latent images.

SUMMARY OF THE INVENTION

It is an object of the present invention to provide a printer which prevents misregistration between color separation latent images.

It is another object of the present invention to provide a printer which prevents misregistration due to structural non-uniformity of the photoreceptor.

It is a further object of the present invention to provide a printer which prevents misregistration due to velocity variation of the photoreceptor caused by the non-uniformity of the photoreceptor.

It is a further object of the present invention to provide a printer having means and a method for controlling the velocity of the photoreceptor based on velocity corrections to provide registration in the process direction.

It is another object of the present invention to provide a printer employing a means and a method for determining velocity corrections based on recording and processing of the time intervals at which the belt holes or other detectable information pass over writing station sensors of the printer.

To achieve the foregoing and other objects and advantages, and to overcome the shortcomings discussed above, the present invention provides registration in the process direction by recording and processing the time intervals $T_{ij}$, where i=1 to (M−1); j=1 to N; M=number of sensors; and N=number of belt holes or other detectable information, in which the hole $H_j$ travels between the sensor spacing of the sensors $S_i$ and $S_{i+1}$ and calculating averaged error values $v_{ij}$ to control a servomechanism, which controls the driving motor of the photoreceptor, as the j-th hole $H_j$ travels between the sensor spacing of $S_i$ and $S_{i+1}$ during the superimpositions of the color separation latent images. Corresponding averaged error values $v_{ij}$ are applied to the belt drive servomechanism at predetermined time periods $d_{ij}$ after an occurrence of a reference event, e.g., detection of a seam hole on the photoreceptor by a seam hole detector, to compensate for the velocity variations caused by non-uniformity of the photoreceptor. The calibration of the averaged error values $v_{ij}$ is performed when a new single pass printer is about to be put into operation, periodically for the same belt, every time a worn belt is replaced with a new belt and/or when a user notices degradation in print quality. In an alternative embodiment, the method of determining the averaged error values $v_{ij}$ is used as a method of verifying the averaged error values, $v_{ij}$, i.e., whether the averaged error values $v_{ij}$ are correct.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
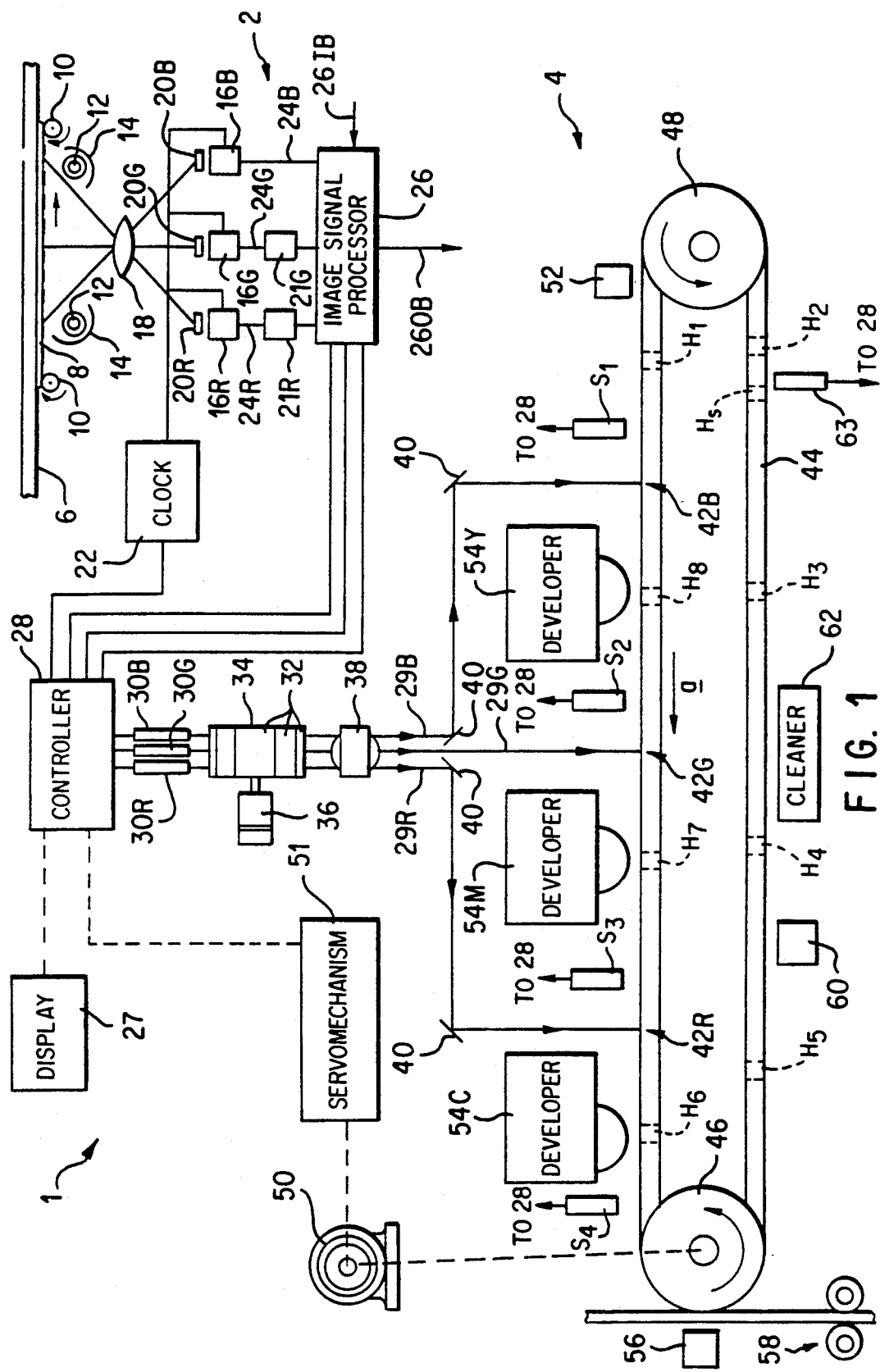
FIG. 1 illustrates a single pass highlight color printer embodying the present invention.

FIG. 1 illustrates the single pass color printer 1 embodying the present invention. The single pass color printer includes an image scanning section 2 and a xerographic processing section 4.

The image scanning section 2 has a platen 6 for supporting an original document 8. The document feed rolls 10 serve to move the original document 8 across the platen 6 during the scanning of the original document 8. Suitable document illuminating means 12, for example, lamps, are provided to illuminate the document, and the reflectors 14 cooperate with the lamps 12 to concentrate the light on the original document 8 during the scanning of the original document 8.

Linear image sensor arrays 16B, 16G, 16B, which may, for example, comprise CCD type arrays, are provided for scanning the original document 8 line by line. The sensor arrays 16B, 16G, 16R are focused onto the original document 8 by a suitable lens 18. To provide the requisite color image signals, blue, green and red color separation filters 20B, 20G, 20R are interposed in the optical scan path of the sensor arrays 16B, 16G, 16R. A clock 22 is provided for operating the sensor arrays 16B, 16G, 16R.

The blue, green and red image signals from the sensor arrays 16B, 16G, 16R are inputted through the lines 24B, 24G, 24R to a suitable image signal processor 26 where the image signals are processed, e.g., amplified, to provide blue, green and red control signals to a controller 28 for the lasers 30B, 30G, 30R. As will be understood by those skilled in the art, the controller 28 serves to control the intensity of the imaging beams 29B, 29G, 29R outputted by the lasers 30B, 30G, 30R in response to the blue, green and red image signals from the sensor arrays 16B, 16G, 16R, respectively. The imaging beams 29B, 29G, 29R are reflected off the mirror facets 32 of a polygon 34 rotated by a motor 36, and a suitable lens 38 serves to focus the imaging beams 29B, 29G, 29R in conjunction with the mirrors 40 onto the exposure points 42B, 42G, 42R of the xerographic processing section 4.

To accommodate the spatial relationship between the imaging beams 29B, 29G, 29R and to assure the registration of the color separation latent images with one another, suitable buffers 21G, 21R may be provided, for example, in the lines 24G, 24R for the green and red image signals, to synchronize the input of the green and red image signals to the image signal processor 26 with each other and with the blue image signal in the line 24B. In the example shown, the buffers 21G, 21R delay the green and red image signals by an interval necessary to accommodate the interval between the time the image signals are produced by the sensor arrays 16B, 16G, 16R and the time the images corresponding thereto are imaged onto a photoreceptor 44 of the xerographic section 4 by the imaging beams 29B, 29G, 29R.

Where desired, color image signals derived from a source other than the sensor arrays 16B, 16G, 16R, e.g., a memory, data communication channel, etc., may be fed to the image signal processor 26 through an image signal input bus 26IB. Similarly, color image signals derived from the sensor arrays 16B, 16G, 16R may be outputted to other devices such as a memory, data communication channel, etc., through an image signal output bus 26OB.

The xerographic processing section 4 includes the photoreceptor 44 illustrated herein in the form of an endless belt stretched across a drive roller 46 and a idler belt support roller 48. The rollers 46, 48 are rotatably mounted in a predetermined fixed position by suitable means (not shown). The drive roller 46 is driven by a drive motor 50 to move the photoreceptor 44 in the direction shown arrow a. While the photoreceptor 44 is illustrated in the form of an endless belt, other photoreceptor configurations, such as a drum, can be used.

A corona charging device 52 is operatively disposed adjacent to the photoreceptor 44. The corona charging device 52 uniformly charges the photoreceptor 44 prior to imaging. The imaging beams 29B, 29G, 29R impinge or contact the photoreceptor 44 at the exposure points 42B, 42G, 42R, respectively. The imaging beams 29B, 29G, 29R provide, respectively, blue, green, and red separation latent images on the photoreceptor 44. A first color developer 54Y provides the yellow toner, a second developer 54M provides the magenta toner, and a third color developer 54C provides the cyan toner.

Following the development of the color separation latent images on the photoreceptor 44 by the colored developers 54Y, 54M, 54C, the developed image is transferred to a predetermined image medium such as paper. To facilitate the transfer, a transfer corotron 56, which is coupled to a high voltage power source, is provided to attract the developed image on the photoreceptor 44 to the predetermined image medium. Following the transfer, the developed image is fixed to the predetermined image medium by a fuser assembly 58. Any residual charges and/or developing material left on the photoreceptor 44 are removed, respectively, by an erase lamp 60 and a cleaning station 62.

In operation, the photoreceptor 44 is uniformly charged by the corona charging device 52. The color image signals, i.e., blue, green, and red, are derived from the original document through scanning thereof by the sensor arrays 16B, 16G, 16R, of the image scanning section 2. The color image signals are processed by the image signal processor 26 and inputted into the controller 28 which regulates the intensity of the imaging beams 29B, 29G, 29R of the lasers 30B, 30G, 30R. The imaging beams 29R, 29G, 29R successively scan across the photoreceptor 44 at the exposure points 42B, 42G, 42R. The rotating polygon 34 imparts a scanning motion to the imaging beams 29B, 29G, 29R to create in succession the blue, green and red separation latent images on the photoreceptor 44.

The blue imaging beam 29B, which first impinges on the photoreceptor 44, exposes the photoreceptor 44 line by line at the exposure point 42B to create the blue separation latent image. The blue separation latent image is developed by the yellow developer 54Y to form a first color image. As the photoreceptor 44, carrying the first color image, moves past the exposure point 42G of the green image beam, a green separation latent image is superimposed on the first color image line by line. To assure image registration with the first color image, the green image signals are delayed for a first predetermined time interval by the buffer 21G. The green separation latent image is thereafter developed by the magenta developer 54M to form a first composite color image. As the photoreceptor 44 moves past the exposure point 42R of the red image beam 29R, the red separation latent image is superimposed on the first composite color image.

For proper registration with the first composite color image, the red image signals are delayed for a second predetermined time interval by the buffer 21R. The red separation latent image is thereafter developed by the cyan developer 54C to form a developed composite color image of the original document. In conjunction with the buffers, writing station sensors $S_1$–$S_3$ detect the arrival of punched holes $H_1$–$H_8$ or other detectable information on the photoreceptor to initiate each of the writing cycles of the separation latent images at the appropriate time.

The developed composite color image is thereafter transferred to the predetermined image medium and fused by the fuser assembly 58 to provide a color copy of the original document. The erase lamp 60 and the cleaning station 62, respectively, discharge and clean the photoreceptor in preparation for the next image development cycle.

If the photoreceptor 44 is an endless belt, the fluctuations in the radius of the belt elastic neutral axis due to the non-uniformity of the belt thickness cause belt velocity variations in all machines where the belt velocity control occurs by accurate control of the rotational speed of a drive roll such as 46. The belt velocity variations will cause the length of each separation latent image to change in the process direction such that registration between, for example, the blue and green separation latent images, is gradually lost proceeding from the leading to the trailing edges of the color separation latent images. To prevent the misregistration caused by the non-uniformity of the photoreceptor, the controller 28, in conjunction with a clock 22, a seam hole $H_S$, a seam hole sensor 63, the sensors $S_1$-$S_4$, and the punched holes $H_1$-$H_8$ determine the averaged error values which occur during every revolution of the photoreceptor 44 to dynamically vary the command to the servomechanism 51, which drives the motor 50, to make the belt velocity constant.

For illustration purposes, the single pass printer 1 in FIG. 1 has M number of sensors $S_1$-$S_3$, e.g., M=4, and N number of holes $H_1$-$H_8$, e.g., N=8. The spacings between the sensors $S_1$-$S_4$ need not be uniform and are either precisely known or can be approximated by measurement. However, great precision is not required in the knowledge of the sensor spacing. Further, the spacings between the holes $H_1$-$H_8$ need not be uniform and does not need to be known with great precision. Moreover, it can be also appreciated that the number of sensors and holes can vary.

Figure 2:
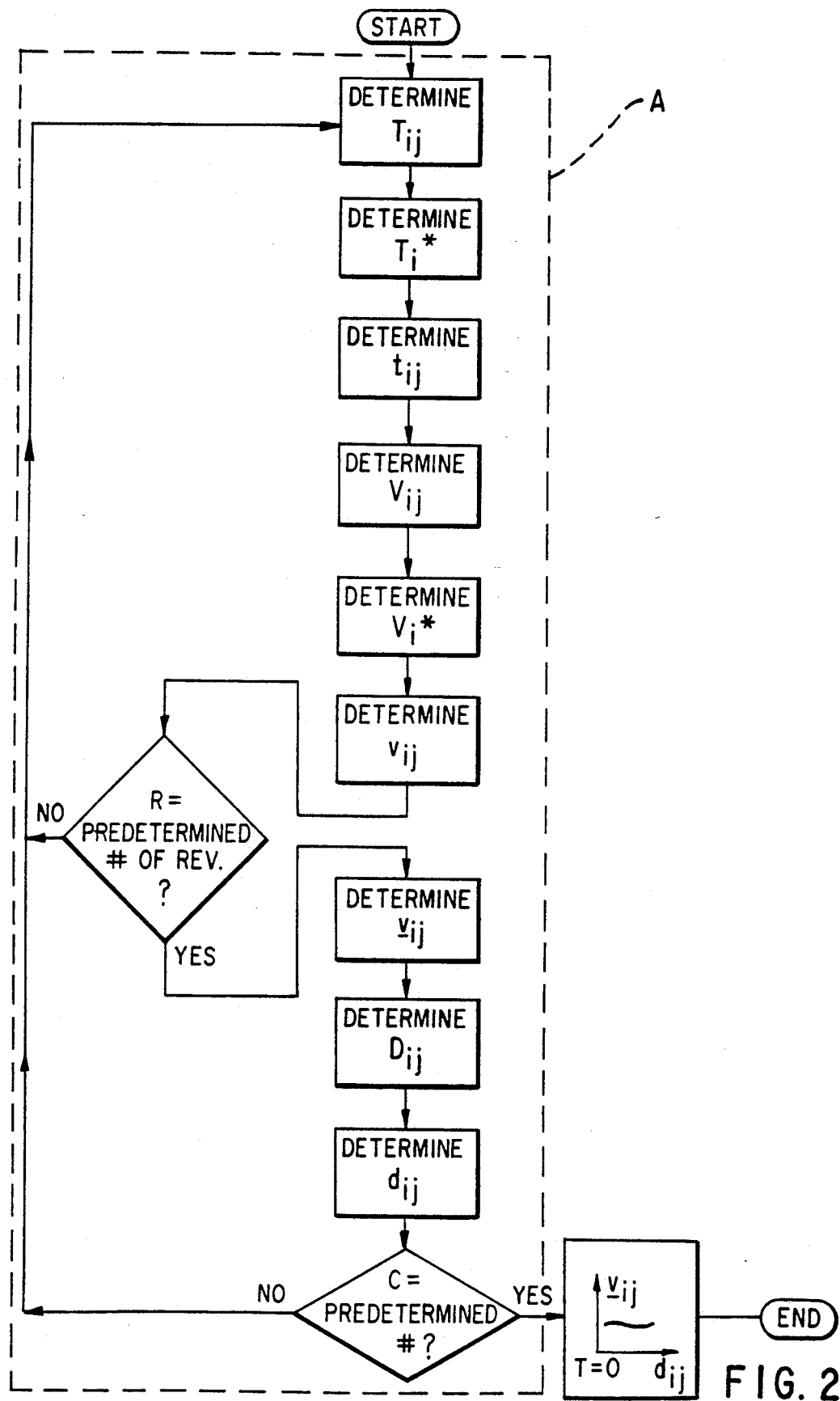
FIG. 2 is a flow chart illustrating the method of determining the averaged error values $v_{ij}$.

FIG. 2 is a flow chart illustrating the method of determining the averaged error values $v_{ij}$ used to control the velocity of the photoreceptor 44. The controller 28 first determines in the start step whether to initiate the process of determining the averaged error values. The controller 28 initiates the process when a new single pass printer is about to be put into operation, or every time a worn photoreceptor belt is replaced with a new belt, or periodically for the same belt. Further, a user can press a button on a display 27 to initiate the process after the user notices degradation in print quality.

Once the process is initiated, the controller 28 measures and stores (M−1)N number of time intervals $T_{ij}$ per revolution in which each j-th hole $H_j$ travels between the sensor spacing of sensors $S_i$ and $S_{i+1}$, where j=1 to N and i=1 to (M−1). For example, the controller 28 measures and stores the time intervals $T_{11}$, $T_{21}$ and $T_{31}$ as the hole $H_1$ travels, respectively, between the sensors $S_1$ and $S_2$, between the sensors $S_2$ and $S_3$ and between sensors $S_3$ and $S_4$. The controller 28 measures and stores the time intervals $T_{ij}$ for each hole $H_j$ to travel between the sensor spacing of the sensors $S_i$ and $S_{i+1}$.

The controller then determines and stores the average transit time $T_i^*$ for all holes $H_1$, $H_2$, ..., $H_N$ to travel between the sensor spacing of sensors $S_i$ and $S_{i+1}$, i.e., $$T_i^* = \frac{\sum_{j=1}^{N} T_{ij}}{N}, \text{ for } i = 1, 2, \ldots, M - 1. \quad (1)$$

Based on the time intervals $T_{ij}$ and average transit time $T_i^*$, the controller 28 determines and stores time errors $t_{ij} = T_{ij} - T_i^*$ for each section of belt 44 between holes $H_i \ldots H_N$ and each sensor spacing.

The controller 28 then determines and stores the velocity errors $v_{ij}$ for each hole $H_j$, j=1 to N, in its travel between each spacing of the sensors $S_i$ and $S_{i+1}$, i=1 to (M−1). Analogous to the time errors which are defined as $t_{ij} = T_{ij} - T_i^*$, the velocity errors are evaluated as $v_{ij} = V_{ij} - V_i^*$, where $$V_{ij} = \frac{\text{sensor spacing of the sensors } S_i \text{ and } S_{i+1}}{T_{ij}}, \quad (2)$$

for $i = 1, 2, \ldots, M - 1; j = 1, 2, \ldots, N$ $$V_i^* = \frac{\sum_{j=1}^{N} V_{ij}}{N}, \text{ for } i = 1, 2, \ldots, M - 1 \quad (3)$$

Since the velocity errors $v_{ij} = V_i^*$ are small in comparison to the average velocities $V_i^*$, a mathematical technique called Taylor Series Expansion can be used to yield the following approximate expression for the velocity errors $$v_{ij} = -[V_i^* t_{ij}]/T_i^*, \text{ for } i=1,2,\ldots,M-1; j=1,2,\ldots,N \quad (4)$$

Equation (4) is utilized to calculate the velocity errors $v_{ij}$. In order to achieve immunity of the measurements $v_{ij}$ from velocity variations introduced by other sources, the process is repeated for a predetermined number of successive revolutions. For example, if the predetermined number of successive revolution is 4, velocity errors $v_{ij}'$, $v_{ij}''$ and $v_{ij}'''$ are determined during the second, third and fourth revolutions, respectively. The velocity errors $v_{ij}$, $v_{ij}'$, $v_{ij}''$, $v_{ij}'''$, etc., are evaluated for several successive belt revolutions and averaged over the number of revolutions in order to derive the averaged error values $v_{ij}$.

From these averaged error values $v_{ij}$, a correction table is computed which approximately describes the distribution of the velocity error of the belt over one revolution relative to the time of a reference event fixed with respect to the belt itself. This reference event can be chosen to be the passage of the belt seam hole $H_s$ over the seam hole sensor 63 or the passage of one of the holes $H_1$ through $H_N$ over a specific sensor recognized by the fact that the hole has some special feature, such as being closely followed by another hole.

The correction table is formed in the following manner. The passage of each hole $H_j$ over sensor $S_i$ occurs a time $D_{ij}$ after the last occurrence of the reference event, such as the seam hole detection. For example, in FIG. 1, when the seam sensor 63 detects the seam hole $H_s$, the controller 28 in conjunction with the clock 22 detects and stores the amount of time $D_{11}$ required for the hole $H_1$ to reach the sensor $S_1$. In other words, the detection of the seam hole is used as a reference in time, e.g., time (T)=0, to determine the passage of time $D_{11}$ since the reference event. Thereafter, the controller 28 detects and stores the amount of time $D_{21}$ required for the hole $H_1$ to reach the sensor $S_2$ relative to the reference time T=0, i.e., detection of the seam hole $H_s$ (reference event). The amount of time $D_{ij}$ is measured for the passage of each hole $H_j$ over each sensor $S_i$ relative to the reference time T=0. Because $T_{ij}$ represent the time intervals for the holes $H_j$ to travel between the spacings of the sensors $S_i$ and $S_{i+1}$, differences between the amount of times $D_{ij}$ and $D_{i+1,j}$ are equivalent to the time intervals $T_{ij}$. Therefore, the averaged error values $v_{ij}$ occurred between times $D_{ij}$ and $D_{i+1,j}$.

In order to compensate for the velocity variations, the averaged error values $v_{ij}$ have to be applied to the servomechanism 51 sometime during the velocity variations which occur in-between the times $D_{ij}$ and $D_{i+1,j}$. However, the exact moment in time at which the velocity variations start and end in-between the times $D_{ij}$ and $D_{i+1,j}$ (during time intervals $T_{ij}$) is unknown. For example, between the times $D_{11}$ and $D_{21}$, it is unknown as to whether the velocity variations start near time $D_{11}$, near time $D_{21}$, or anywhere in-between the times $D_{11}$ and $D_{21}$. Thus, regardless of exactly when the velocity variations begin, an arbitrary point in time between the times $D_{ij}$ and $D_{i+1,j}$ is chosen to indicate the start of the velocity variations during the time intervals $T_{ij} = D_{i+1,j} - D_{ij}$. In the preferred embodiment, the arbitrary point in time is chosen in-between the times $D_{ij}$ and $D_{i+1,j}$, and in particular, the arbitrary point in time is the average passage of times $d_{ij} = (D_{ij} + D_{i+1,j})/2$. Accordingly, the corresponding averaged error values $v_{ij}$ are then associated with the corresponding average passage of times $d_{ij}$.

Plotting all available values of $v_{ij}$ against their respective times $d_{ij}$ relative to the reference event, i.e., $T=0$, produces a point graph which can be curve fitted by standard technique to produce the velocity correction profile over one belt revolution starting with the reference event. To optimize the point graph, the whole process may be repeated a predetermined number of times. For example, in the single pass printer of FIG. 1, there are twenty four averaged error values $v_{ij}$ to plot against $d_{ij}$. This may be insufficient for an accurate velocity correction profile. For optimization and for immunization of the averaged error values from belt variations caused by other sources, the entire process may be repeated. If the process was repeated four times, there would be a total of ninety six averaged error values to plot against ninety six average passage of times. Such repetition provides a more accurate velocity correction profile over one belt revolution.

The velocity correction table is then used to dynamically vary the command to the servomechanism 51 which drives motor 50 in a manner which makes the belt velocity constant in time. The correction is repeated for every belt revolution. The technique by which the command, also called setpoint, of a servomechanism is dynamically altered in time is called "feedforward" in the servomechanism technology. In order to achieve appropriate compensation of realistic errors induced by belt thickness variations, the sensitivity of the velocity control must of the order of one part in 100000.

For example, if the superimposed latent images are about to be formed between the area of the holes $H_1$ and $H_2$ during the operation of the single pass printer in FIG. 1, the controller waits until time $T=d_{11}$ after the seam hole detector 63 detects the seam hole (reference event, time $T=0$) to send a command $v_{11}$ to the servomechanism 51 to increase or decrease the velocity of the photoreceptor 44 in order to compensate for the velocity variations which occur while the hole $H_1$ travels between the sensors $S_1$ and $S_2$ and to maintain the original velocity of the photoreceptor 44 which decreases or increases due to the non-uniformity of the photoreceptor 44. The controller then waits until time $T=d_{21}$ after the reference event to send a command $v_{21}$ to the servomechanism 51 to increase or decrease the velocity of the photoreceptor 44 of the photoreceptor 44 while the hole $H_1$ travels between the sensors $S_2$ and $S_3$ to maintain the original velocity of the photoreceptor 44. Thereafter, the controller waits until time $T=d_{31}$ to send a command $v_{31}$ to the servomechanism 51 while the hole $H_1$ travels between the sensors $S_3$ and $S_4$. If the next superimposed latent image is formed between the area of the holes $H_5$ and $H_6$ prior to one full belt revolution, the controller 28 sends the commands $v_{15}$, $v_{25}$ and $v_{35}$ at times $T=d_{15}$, $d_{25}$ and $d_{35}$, respectively, after the reference event to control the velocity of the photoreceptor as to maintain the original velocity.

When the seam hole sensor 63 again detects the seam hole $H_s$, the detection indicates a completion of a revolution and this detection is used a reference event during the next belt revolution and the time T is again set to zero. The correction in belt velocity is repeated for every belt revolution by sending the averaged error values $v_{ij}$ to the servomechanism 51 at time $T=d_{ij}$ after the reference event. Accordingly, it can be appreciated that the location of the seam hole $H_s$ and seam hole sensor 63 can be anywhere along the photoreceptor 44.

Figure 3:
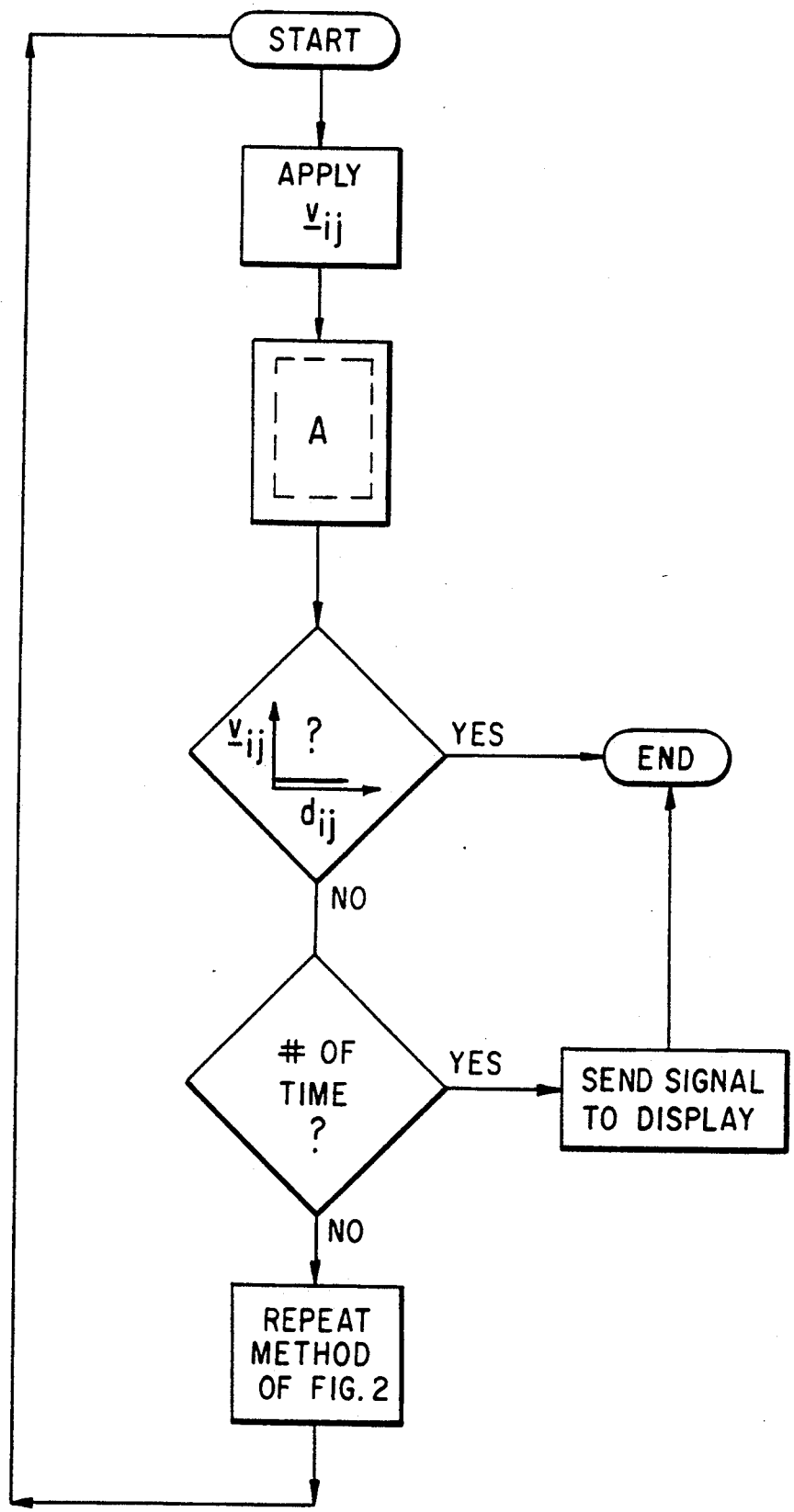
FIG. 3 is a flow chart illustrating the method of verifying the averaged error values $v_{ij}$.

In another embodiment and as illustrated in FIG. 3, the above method of determining the averaged error values $v_{ij}$ and method of controlling the velocity of the photoreceptor based upon the average error values can be used to verify that the averaged error values $v_{ij}$ are accurate or the method of determining the averaged error values $v_{ij}$ was properly done. In order to verify the averaged error values, the same method of determining the averaged error values is initiated by the controller 28 to determine a second set of averaged error values while the previously calculated velocity correction table is used to dynamically vary the command to the servomechanism 51.

For example, after forming the correction table following the method illustrated in FIG. 2 and while the correction table is used to dynamically vary the command to the servomechanism 51 to control the velocity of the photoreceptor 44, a portion A (dotted line) of the method shown in FIG. 2 is repeated. If the formation of the correction table was properly done, all of the averaged error values of the second set would have substantially similar values or the point graph formed during the verification should be substantially a flat horizontal line at $v_{ij}$ about zero, because the belt velocity is constant. However, if the values of the error values of the second set have substantially dissimilar values or if the point graph is not a horizontal line, the entire method of FIG. 2 is repeated to form another correction table, to replace the erroneous correction table and the verification method is repeated until $v_{ij}$ vs. $d_{ij}$ on the point graph form a horizontal line. If the verification method is repeated, for example, three to four times and still the line formed by $v_{ij}$ vs $d_{ij}$ is not a horizontal line, the controller 28 will send a signal to the display 27 to indicate to the user that the single pass printer need to be serviced by a technician.

While the present invention has been described in a specific embodiment thereof, it is evident that many alternatives, modifications and variations will be apparent to those skilled in the art. The present invention can be also used with other types of printers such as image-on-image and tandem printers. Further, the present invention can be used in the non-single pass printers to prevent misregistration due to velocity variation of the photoreceptor caused by photoreceptor non-uniformity. Moreover, separate controllers can be used for the laser and the servomechanism. Thus, the foregoing embodiments are illustrative and not limiting. Various modifications may be made without departing from the spirit and scope of the invention as defined in the following claims.

What is claimed is:

1. An image forming apparatus comprising:
a photoreceptor rotating at a predetermined velocity;
latent image means for successively forming a plurality of latent images on said photoreceptor;
developer means for developing said plurality of latent images as each of said plurality of latent images is superimposed over each other on said photoreceptor;
transfer means for transferring said superimposed and developed plurality of latent images onto a predetermined image medium;
a reference information on said photoreceptor;
a sensor for detecting said reference information;
a plurality of information on said photoreceptor;
a plurality of spaced sensors for detecting said plurality of information;
means for determining error values, said error values indicating deviations of said photoreceptor from said predetermined velocity, said means for determining error values comprising:
  means for measuring time intervals indicative of time periods for each of said plurality of information on said photoreceptor to travel past each of said plurality of spaced sensors during a revolution of said photoreceptor;
  means for averaging said time intervals to determine average transit times for each of said plurality of information to travel between each sensor spacing of said plurality of spaced sensors;
  means for determining time errors based on differences between said time intervals and average transit times for each of said plurality of information to travel between each sensor spacing of said plurality of spaced sensors;
  means for determining averaged velocities of areas between said plurality of information to travel between said plurality of spaced sensors; and
  means for determining velocity errors based upon at least one of said average transit times, time errors and averaged velocities, wherein said photoreceptor is rotated repeatedly to determine a plurality of velocity errors and said error values are averaged velocity errors of said plurality of velocity errors; and
registration means for providing registration between each of said plurality of latent images, said registration means controlling movements of said photoreceptor based upon said error values so that said registration means compensates for velocity variations caused by non-uniformity of said photoreceptor and so that said photoreceptor rotates at said predetermined velocity.

2. The image forming apparatus of claim 1, wherein said error value determining means further comprises:
means for measuring time periods for each of said plurality of information on said photoreceptor to travel past each of said plurality of spaced sensors after said sensor detects said reference information; and
means for determining averaged passage of time by averaging time periods of adjacent spaced sensors of said plurality of spaced sensors, said averaged passage of time being indicative of time periods after the detection of the reference information by said sensor for supplying said error values to said registration means to maintain said predetermined velocity of said photoreceptor and to compensate for non-uniformity of said photoreceptor.

3. The image forming apparatus of claim 1, wherein said registration means comprises:
a servomechanism for controlling the movements of said photoreceptor; and
means for supplying said servomechanism with said error values at predetermined time periods after said sensor detects said reference information.

4. The image forming apparatus of claim 1, wherein said reference information is a seam hole and said plurality of information is a plurality of holes on said photoreceptor.

5. The image forming apparatus of claim 1 further comprising means for verifying said error values to accurately indicate said deviations of said photoreceptor from said predetermined velocity while said registration means controls the movements of said photoreceptor based upon said error values.

6. The image forming apparatus of claim 5, wherein said verifying means comprises:
means for determining a plurality of confirming error values, said plurality of confirming error values indicating deviations of said photoreceptor from said predetermined velocity while said registration means controls the movements of said photoreceptor based upon said error values to maintain said predetermined velocity of said photoreceptor;
means for comparing each of said plurality confirming error values with one another to determine if all of said plurality of confirming error values have substantially similar values; and
means for remeasuring said error values when said confirming error values have substantially dissimilar values.

7. The image forming apparatus of claim 6, wherein said remeasuring means and measuring measuring means of said error values are the same.

8. A method of providing registration between a plurality of superimposed images formed on a photoreceptor in an image forming apparatus having a reference information on the photoreceptor, a sensor for detecting the reference information, a plurality of information on the photoreceptor, and a plurality of spaced sensors for detecting the plurality of information as the photoreceptor which is controlled by a servomechanism rotates at a predetermined velocity, the method comprising the steps of:
measuring error values indicative of velocity errors of the photoreceptor from the predetermined velocity caused by non-uniformity of the photoreceptor, the step of measuring error values comprising:
  measuring time intervals indicative of time periods for each of the plurality of information on said photoreceptor to travel past each of the plurality of spaced sensors during a revolution of the photoreceptor;
averaging the time intervals to determine average transit times for each of the plurality of information to travel between each sensor spacing of the plurality of spaced sensors;
determining time errors based on differences between the time intervals and average transit times for each of the plurality of information to travel between each sensor spacing of the plurality of spaced sensors;

determining averaged velocities of areas between the plurality of information to travel between the plurality of spaced sensors; and determining velocity errors based upon at least one of the average transit times, time errors and averaged velocities, wherein the photoreceptor is rotated repeatedly to determine a plurality of velocity errors and the error values are averaged velocity errors of the plurality of velocity errors; and controlling movements of the photoreceptor based upon the error values so that velocity variations of the photoreceptor are compensated and the photoreceptor rotates at the predetermined velocity.

9. The method of claim 8, wherein the step of measuring error values further comprises:

measuring time periods for each of the plurality of information on the photoreceptor to travel past each of the plurality of spaced sensors after the sensor detects the reference information; and determining averaged passage of time by averaging time periods of adjacent spaced sensors of the plurality of spaced sensors, the averaged passage of time being indicative of time periods after the detection of the reference information by the sensor for supplying the error values to the registration means to maintain the predetermined velocity of the photoreceptor and to compensate for non-uniformity of the photoreceptor.

10. The method of claim 8, wherein the step of controlling the movements of the photoreceptor comprises:

supplying the servomechanism with the error values at predetermined time periods after the sensor detects the reference information so that the servomechanism regulates the photoreceptor to travel at the predetermined velocity and compensates for the velocity variations due to non-uniformity of the photoreceptor.

11. The method of claim 8, further comprising the step of:

verifying the error values to determine that the error values are accurately controlling the photoreceptor to maintain the predetermined velocity.

12. The method of claim 11, wherein the step of verifying the error values comprises:

determining a plurality of confirming error values, the plurality of confirming error values indicating deviations of the photoreceptor from the predetermined velocity while the registration means controls the movements of the photoreceptor based upon the error values to maintain the predetermined velocity of the photoreceptor;

comparing each of the plurality confirming error values with one another to determine if all of the plurality of confirming error values have substantially similar values; and remeasuring the error values when the confirming error values have substantially dissimilar values.

13. The method of claim 12, wherein the step of remeasuring the error values is the same as the step of measuring the error values.

14. An image forming apparatus comprising:

a photoreceptor rotating at a predetermined velocity;

latent image means for successively forming a plurality of latent images on said photoreceptor;

developer means for developing said plurality of latent images as each of said plurality of latent images is superimposed over each other on said photoreceptor;

transfer means for transferring said superimposed and developed plurality of latent images onto a predetermined image medium;

means for determining error values, said error values indicating deviations of said photoreceptor from said predetermined velocity;

means for verifying said error values to accurately indicate said deviations of said photoreceptor from said predetermined velocity while said registration means controls the movements of said photoreceptor based upon said error values, said verifying means comprising:

means for determining a plurality of confirming error values, said plurality of confirming error values indicating deviations of said photoreceptor from said predetermined velocity while said registration means controls the movements of said photoreceptor based upon said error values to maintain said predetermined velocity of said photoreceptor;

means for comparing each of said plurality of confirming error values with one another to determine if all of said plurality of confirming error values have substantially similar values; and means for remeasuring said error values when said confirming error values have substantially dissimilar values; and registration means for providing registration between each of said plurality of latent images, said registration means controlling movements of said photoreceptor based upon said error values so that said registration means compensates for velocity variations caused by non-uniformity of said photoreceptor and so that said photoreceptor rotates at said predetermined velocity.

15. A method of providing registration between a plurality of superimposed images formed on a photoreceptor in an image forming apparatus having a reference information on the photoreceptor, a sensor for detecting the reference information, a plurality of information on the photoreceptor, and a plurality of spaced sensors for detecting the plurality of information as the photoreceptor which is controlled by a servomechanism rotates at a predetermined velocity, the method comprising the steps of:

measuring error values indicative of velocity errors of the photoreceptor from the predetermined velocity caused by non-uniformity of the photoreceptor;

verifying the error values to determine that the error values are accurately controlling the photoreceptor to maintain the predetermined velocity, the step of verifying the error values comprising:

determining a plurality of confirming error values, the plurality of confirming error values indicating deviations of the photoreceptor from the predetermined velocity while the registration means controls the movements of the photoreceptor based upon the error values to maintain the predetermined velocity of the photoreceptor;

comparing each of the plurality of confirming error values with one another to determine if all of the plurality of confirming error values have substantially similar values; and remeasuring the error values when the confirming error values have substantially dissimilar values; and controlling movements of the photoreceptor based upon the error values so that velocity variations of the photoreceptor are compensated and the photoreceptor rotates at the predetermined velocity.

* * * * *